June 10, 1941.    G. F. SHEPPARD    2,245,161
TRANSMISSION MECHANISM
Filed March 27, 1940    2 Sheets—Sheet 1

INVENTOR
GEORGE F. SHEPPARD
BY Fetherstonhaugh & Co.
ATTORNEYS

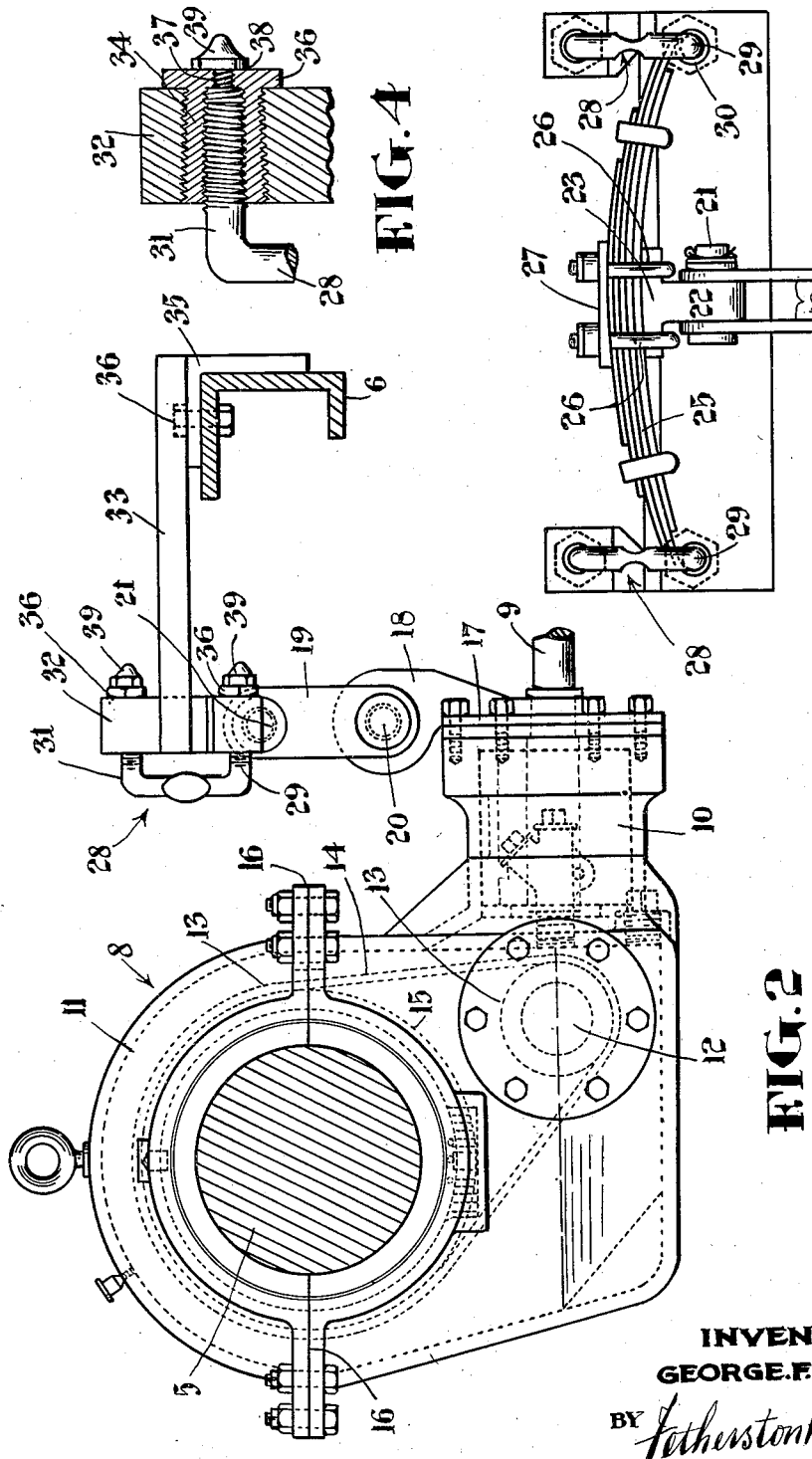

Patented June 10, 1941

2,245,161

UNITED STATES PATENT OFFICE 2,245,161

TRANSMISSION MECHANISM

George F. Sheppard, Montreal, Quebec, Canada

Application March 27, 1940, Serial No. 326,260

1 Claim. (Cl. 105—118)

This invention relates to transmission mechanism for driving a generator from one of the truck axles of a railway car. More particularly, the invention resides in the provision of improved means for supporting the transmission casing which encloses the component elements of the drive gearing provided between the car axle and the tail shaft of the transmission assembly.

In transmission mechanisms of the type to which this invention relates one end of the transmission casing is supported for turning movement on the generator driving axle and the other end is suspended from a sill of the truck or from some part of the car body by some form of jointed or flexible suspension means.

The purpose of the present invention is to provide an improved form of suspension means for supporting the transmission casing in an efficient and satisfactory manner, said means being designed to permit free movement of the transmission casing in the directions necessary to relieve the transmission mechanism of strains that would otherwise be imposed thereon by the changes which occur in the relative positioning of the axle, truck and car body when the car is in service.

According to this invention the end of the transmission casing which is to be supported from the truck frame or car body is pivotally attached to the lower ends of a pair of links having their upper ends pivotally attached to the central portion of a laminated leaf spring arranged transversely of the truck frame, the arrangement being such that the links are free to swing in the longitudinal direction of the truck frame about their upper and lower pivots. The ends of the leaf spring are carried between the ends of a pair of shackles having their upper ends attached to suitable supporting brackets so that said shackles are free to swing in the transverse direction of the truck frame, the supporting brackets in question being attached either to a sill member of the truck frame or to some part of the car body.

In the preferred embodiment of the invention the leaf spring supporting shackles are attached to brackets carried by one of the sill members of the truck frame since it is preferable that the suspension means, as a whole, be movable with the truck relative to the car body.

Proceeding now to a more detailed description of the invention, reference will be had to the accompanying drawings, in which:

Fig. 2 is a side view of the assembly shown in Fig. 1.

Fig. 3 is a detail view showing the mounting of the laminated leaf spring from which the transmission casing is suspended.

Fig. 4 is a detail view showing the manner in which the ends of the spring supporting shackles are pivotally fastened to the spring and to the shackle supporting brackets.

Figure 1:
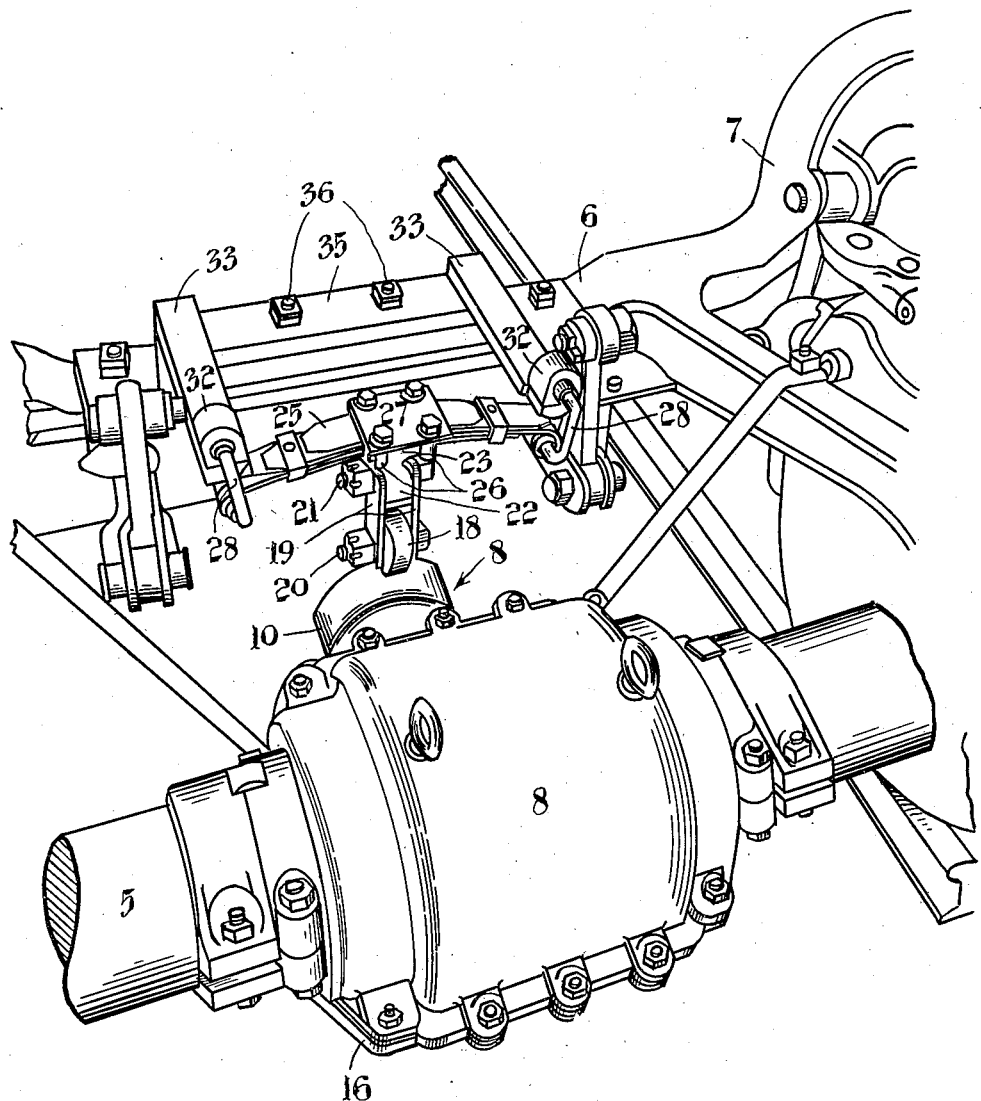
Fig. 1 is a perspective view of a transmission assembly supported in accordance with my invention.

Referring more particularly to the drawings, 5 designates one of the truck axles of a railway car and 6 one of the sill members of the truck frame 7 in which the axle is journalled.

The transmission assembly generally indicated at 8 may be constructed as described in my co-pending application Serial No. 326,716, filed March 29, 1940, or may be of any other suitable or conventional design. In the present instance such assembly comprises a tail shaft 9 which extends into the head end 10 of the transmission casing 11 and is driven by suitable gearing (not shown) from the jack shaft 12 which is journalled in the casing 11 parallel with the axle 5. The shaft 12 is fitted with suitable sprockets 13 which are driven by chains 14 from suitable drive sprockets 15 which rotate with the axle 5. The end of the casing remote from the head end 10 is turnably mounted on the axle 5 and is split as indicated at 16 to permit convenient application and removal thereof.

The head end 10 of casing 11 is provided with a cover plate 17 having a vertically extending lug 18 cast integral therewith. Lug 18 is fitted between and pivotally secured to the lower ends of a pair of suspension links 19 by means of a pivot bolt 20 which extends in the same direction as the axle 5. The upper ends of links 19 are fastened by a pivot bolt 21 to a lug 22 depending from a plate 23 which is clamped to the central portion of a laminated leaf spring 25 by means of the U-shaped clamping bolts 26 and the clamping plate 27. The pivot bolt 21 extends in the same direction as the pivot bolt 20 and is therefore parallel with the axle 5. The leaf spring 25 is carried between the lower ends of a pair of shackles 28 which are mounted to swing in a direction transversely of the truck frame 7.

As here shown, each shackle 28 comprises a U-shaped bolt presenting a lower horizontal arm 29 pivotally secured within an eye 30 provided at one end of the spring 25 and an upper horizontal arm 31 which is pivotally secured within a lug 32 provided at one end of a bracket arm 33. The ends of the bracket arms 33 remote from the links 28 are welded or otherwise fastened to an angle bar 35 which in turn is fastened by bolts 36 or welded to the truck sill 6.

Figure 4 shows in detail the manner in which the upper arm 31 of each shackle 28 is pivotally anchored to the lug 32 and it will be understood that the same type of anchorage is provided between the lower arm 29 of the shackle and the eye 30 of spring 25. As shown in Figure 4 the arm 31 of each shackle 28 is threaded into a bushing 34 which is also in threaded engagement with the wall of a threaded opening 35 provided in the lug 32. The bushing 34 is provided with a head 36 bearing against one side of the lug 32 and this head 36 is provided with a restricted opening 37 to receive the threaded stem 38 of a lubricating fitting 39. The threaded connection between the arm 31 and bushing 34 permits the shackle 28 to have the necessary swinging movement relative to lug 32.

When the transmission casing is supported as described herein, it has sufficient freedom of movement with respect to both the axle 5 and the truck frame 7 to relieve the transmission mechanisms of all strains that would otherwise be imposed thereon by movement of the axle 5 and the frame 7 relative to each other and permits freedom of axle movement in all directions as required by A. A. R. standards.

In this connection it will be seen that the transmission casing is supported for longitudinal movement in relation to the truck frame by links 19 and is also supported for transverse movement in relation to the truck frame by the links 28. The leaf spring 25 provides a yielding connection between the lower supporting links 19 and the upper supporting links 28 which takes care of vertical movement between the axle 5 and the truck frame 7.

Having thus described my invention, what I claim is:

In a transmission mechanism for driving a generator from one of the truck axles of a railway car the combination of a transmission assembly including a gear casing having one end mounted on said axle and means for suspending the opposite end of said casing from a stationary part of the truck frame, said means comprising brackets attached to said stationary part of the truck frame, a spring extending transversely of the truck frame, link means suspending the ends of the spring from said brackets so as to permit movement of the spring in the transverse direction of the truck, a plate clamped to the central portion of said spring and provided with a downwardly directed lug overlying an upwardly directed lug carried by the last mentioned end of the casing and a pair of rigid link members having their upper ends pivotally connected to opposite sides of the first mentioned lug and their lower ends pivotally connected to opposite sides of the last mentioned lug, said link members being swingable in the longitudinal direction of the truck.

GEORGE F. SHEPPARD.